US010147969B2

(12) United States Patent
Shibutani et al.

(10) Patent No.: US 10,147,969 B2
(45) Date of Patent: Dec. 4, 2018

(54) ELECTROLYTIC SOLUTION FOR ELECTROCHEMICAL DEVICES AND ELECTROCHEMICAL DEVICE IN WHICH THE ELECTROLYTIC SOLUTION IS USED

(71) Applicants: PANASONIC CORPORATION, Osaka (JP); Kyoto University, Kyoto (JP)

(72) Inventors: Satoshi Shibutani, Osaka (JP); Takeshi Abe, Osaka (JP); Zempachi Ogumi, Kyoto (JP)

(73) Assignees: PANASONIC CORPORATION, Osaka (JP); KYOTO UNIVERSITY, Kyoto (JP)

( * ) Notice: Subject to any disclaimer, the term of this patent is extended or adjusted under 35 U.S.C. 154(b) by 116 days.

(21) Appl. No.: 15/290,495

(22) Filed: Oct. 11, 2016

(65) Prior Publication Data

US 2017/0104237 A1 Apr. 13, 2017

(30) Foreign Application Priority Data

Oct. 13, 2015 (JP) .................................. 2015-201912

(51) Int. Cl.
| H01M 2/00 | (2006.01) |
| H01M 10/0567 | (2010.01) |
| H01M 4/133 | (2010.01) |
| H01M 4/136 | (2010.01) |
| H01M 10/0525 | (2010.01) |
| H01M 10/0568 | (2010.01) |
| H01M 10/0569 | (2010.01) |
| H01M 10/05 | (2010.01) |

(52) U.S. Cl.
CPC ....... *H01M 10/0567* (2013.01); *H01M 4/133* (2013.01); *H01M 4/136* (2013.01); *H01M 10/05* (2013.01); *H01M 10/0525* (2013.01); *H01M 10/0568* (2013.01); *H01M 10/0569* (2013.01); *H01M 2220/20* (2013.01); *H01M 2220/30* (2013.01); *Y02E 60/13* (2013.01)

(58) Field of Classification Search
CPC ..................................................... H01M 2/00
See application file for complete search history.

(56) References Cited

U.S. PATENT DOCUMENTS

2006/0269834 A1* 11/2006 West .................. H01M 4/133
429/105
2017/0179464 A1* 6/2017 Ein-Eli ............... H01M 4/044

FOREIGN PATENT DOCUMENTS

| JP | 2008-543002 A | 11/2008 |
| JP | 2012-169138 | * 10/2012 |
| JP | 2013-145758 A | 7/2013 |
| WO | 2007/146453 A2 | 12/2007 |

OTHER PUBLICATIONS

W. West et al., "Reversible intercalation of fluoride-anion receptor complexes in graphite," Journal of the Electrochemical Society, 154 10 A929-A936 2007.

* cited by examiner

*Primary Examiner* — Jacob B Marks
(74) *Attorney, Agent, or Firm* — McDermott Will & Emery LLP (57) ABSTRACT

An electrolytic solution for electrochemical devices includes: a salt consisting of a bifluoride anion and a cation; a compound containing boron; and an organic solvent.

8 Claims, 6 Drawing Sheets

ELECTROLYTIC SOLUTION FOR ELECTROCHEMICAL DEVICES AND ELECTROCHEMICAL DEVICE IN WHICH THE ELECTROLYTIC SOLUTION IS USED

RELATED APPLICATIONS

This application claims the benefit of Japanese Application No. 2015-201912, filed on Oct. 13, 2015, the disclosure of which is incorporated by reference herein.

BACKGROUND

1. Technical Field:

The present application relates to an electrolytic solution for electrochemical devices, such as rechargeable batteries, and an electrochemical device.

2. Description of the Related Art:

Development of portable devices such as smartphones and electric vehicles has demanded the batteries of these devices and vehicles to have a larger capacity. For example, large-capacity batteries which are already in practical use, such as lithium ion batteries, have been demanded to have a still larger capacity.

An electrochemical device which allows anions to be inserted and deinserted is expected to have a large capacity. Particularly, a fluoride ion has the characteristics of low atomic mass and high electron affinity and electrochemically stable over a large voltage range near the standard hydrogen electrode potential. Thus, it is expected that using a fluoride ion as a negative charge carrier can realize a large-capacity electrochemical device.

Japanese Laid-Open Patent Publication No. 2013-145758 discloses an electrochemical cell in which the positive electrode and the negative electrode reversibly exchange negative charge carriers. Specifically, this publication discloses an electrolytic solution in which fluorides of alkali metals, exclusive of lithium, and alkali earth metals are dissolved, and an electrochemical cell in which an electrode containing a partially-fluorinated carbonaceous material is used.

Japanese PCT National Phase Laid-Open Publication. No. 2008-543002 discloses a non-aqueous electrolytic solution which contains lithium fluoride and an anion receptor, and a lithium ion rechargeable battery which has a positive electrode and an negative electrode of graphite.

Journal of The Electrochemical Society, 154 10 A929-A936 2007 reports about production of an electrochemical cell, which uses a positive electrode containing a graphite and an electrolytic solution in which a complex of a fluoride ion and an anion receptor is dissolved, and about the results of research on the charge/discharge characteristics achieved by insertion/deinsertion of anions in/from the positive electrode.

SUMMARY

A non-limiting exemplary embodiment of the present application provides an electrolytic solution for electrochemical devices that are capable of storing energy, in which anions containing fluorine are used, and an electrochemical device.

An electrolytic solution for electrochemical devices according to a non-limiting exemplary embodiment of the present application includes: a salt consisting of a bifluoride anion and a cation; a compound containing boron; and an organic solvent.

Using an electrolytic solution of the present disclosure enables to increase the discharge capacity of the graphite positive electrode that allows anions to be inserted and deinserted and to increase the discharge capacity of an electrochemical device, such as rechargeable batteries.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification, and drawings disclosure, and need not all be provided in order to obtain one or more of the same.

DETAILED DESCRIPTION

The inventors of the present application cl y examined electrochemical cells disclosed in the prior art. Electrochemical cells disclosed in Journal of The Electrochemical Society, 154 10 A929-A930 2007 and Japanese PCT National Phase Laid-Open Publication No. 2008-543002 include an electrolytic solution in which lithium fluoride and an anion receptor are dissolved. According to these documents, the discharge capacities of these electrochemical cells are much smaller than theoretically-expected discharge capacities. This is probably because a fluoride ion which is in the form of a complex with an anion receptor is inserted into a graphite, but the complex is unlikely to be inserted into a deeper part of the graphite since the anion receptor is bulky, and the inserted complex is unlikely to be easily ejected out of the graphite. In view of such problems, the inventors of the present application conceived a novel electrolytic solution for electrochemical devices and a novel electrochemical device.

Hereinafter, an embodiment of the present disclosure is described with reference to the drawings. In the present disclosure, the "electrochemical device" is a generic term that includes rechargeable batteries, electrochemical energy storage devices which are capable of repeatedly storing charge by charging and discharging, such as capacitors, hybrid capacitors, etc., and primary batteries.

An electrochemical device of the present embodiment includes a positive electrode, a negative electrode, and an electrolytic solution which is present between the positive electrode and the negative electrode and which is in contact with the positive electrode and the negative electrode. The respective components are specifically described below.

1. Respective Components of Electrochemical Device (1) Electrolytic Solution

An electrolytic solution of the present disclosure includes a salt consisting of a bifluoride anion and a cation, a compound containing boron, and an aprotic organic solvent.

Examples of the salt consisting of a bifluoride anion and a cation include tetrabutylammonium bifluoride, potassium bifluoride, and sodium bifluoride. These salts are merely exemplary. For example, tetraalkylammonium of varying carbon numbers can be used as the cation.

The bifluoride anion functions as a negative charge carrier in the electrochemical device. A conventional fluoride ion ionized from lithium fluoride or the like cannot be dissolved into an organic solvent without forming complex with an anion receptor and is difficult to solely dissolve into an organic solvent with a high concentration. Meanwhile, the bifluoride anion is a complex ion formed by hydrogen bonding of a fluoride ion and a hydrogen fluoride (HF) molecule. The bifluoride anion has linear configuration such that a hydrogen atom is at the core, and fluorine atoms are at opposite ends, with electric charges being delocalized at the three atoms. Therefore, it is mated that the bifluoride anion is more likely to dissolve into an aprotic solvent than the fluoride ion.

Examples of the compound containing boron include tris(hexafluoroisopropyl) borate, tris(2,2,3,3-tetrafluoropropyl) borate, and tris(pentafluorophenyl) borane. These boron compounds are merely exemplary. A different organic boron compound may be used. The compound containing boron improves the oxidation resistance of the electrolytic solution, and suppresses decomposition of the electrolytic solution which can be caused by oxidation of the organic solvent in the electrolytic solution.

Examples of the solvent include sulfolane, propylene carbonate, dimethyl carbonate, acetonitrile, ethyl isopropyl sulfone, 3-methyl sulfolane, and ethyl methyl sulfone. Any other solvent may he used.

It is preferred that the electrolytic solution contains the salt consisting of a bifluoride anion and a cation in a proportion of, for example, not less than 0.01 mol/L and not more than 1.0 mol/L. If the amount of the salt contained is less than 0.01 mol/L, the ion conductivity of the electrolytic solution is excessively small. If the amount of the salt contained is more than 1.0 mol/L, the bifluoride anion does not entirely dissolve into the electrolytic solution, so that there is a probability that it remains undissolved or separates from the solvent.

From the viewpoint of improving the oxidation resistance, it is preferred that, in the electrolytic solution, the concentration of the compound containing boron. is generally equal to or higher than that of the salt consisting of a bifluoride anion and a cation. More preferably, the concentration of the compound containing boron is generally equal to or higher than the concentration of the salt and is not more than three times the concentration of the salt.

(2) Positive Electrode

The positive electrode contains graphite. Examples of the graphite include natural graphite, artificial graphite, and soft carbon which has a large number of graphite-like regular structures. An example of the soft carbon is micro carbon mesobeads. Any other type of graphite may be used. As will be described below, the graphite of the positive electrode undergoes insertion/deinsertion of a fluoride ion which is separated from the bifluoride anion.

The above-described graphite contained in the positive electrode is in the form of a cathodic mixture prepared by a common manufacturing method. In this case, the cathodic mixture can contain various additives for use in formation of electrodes of a rechargeable battery, such as a conductive additive, a binder, etc.

The surface of the graphite may be covered with a solid electrolyte which has fluoride ion conductivity, such as lanthanum fluoride. Due to the presence of the solid electrolyte, the graphite and the electrolytic solution do not come into direct contact with each other. This provides the effect of suppressing oxidative decomposition of the electrolytic solution.

(3) Negative Electrode

The negative electrode can be selected according to the form of the electrochemical device. When the electrochemical device is an electrical double layer capacitor, the negative electrode used can be, for example, an activated carbon electrode.

When the electrochemical device is a rechargeable battery, the negative electrode can contain various metal fluorides as the active material. Examples of the metal fluorides include lanthanum fluoride, calcium fluoride, aluminum fluoride, europium fluoride, tin fluoride, indium fluoride, vanadium fluoride, cadmium fluoride, chromium fluoride, iron fluoride, zinc fluoride, gallium fluoride, titanium fluoride, niobium fluoride, manganese fluoride, ytterbium fluoride, zirconium fluoride, samarium fluoride, cerium fluoride, and lead fluoride. Various other metal fluorides than those listed herein may be used.

The metal fluoride contained in the negative electrode is in the form of an anodic mixture prepared by a common manufacturing method. In this case, the anodic mixture can contain various additives for use in formation of electrodes of a rechargeable battery, such as a conductive additive, a binder, etc.

(4) Separator

The electrochemical device of the present embodiment is capable of charging and discharging so long as the positive electrode and the negative electrode are electrically separated from each other and the electrolytic solution is kept in contact with the positive electrode and the negative electrode. For practical reasons, in order to realize an electrochemical device in a stable form, the electrochemical device may further include a separator, such as those commonly used in rechargeable batteries. The separator is a resin layer which is made of a resin which does not have electron conductivity, and is a microporous film which has high ion permeability and which has predetermined mechanical strength and electrical insulation. The separator is preferably made of a material which is resistant to the above-described non-aqueous electrolytic solution. For example, a polyolefin resin can be used which is made of any, or a combination, of polypropylene, polyethylene, etc., such as those commonly used in lithium rechargeable batteries.

(5) Configuration of Entire Electrochemical Device

Figure 11:
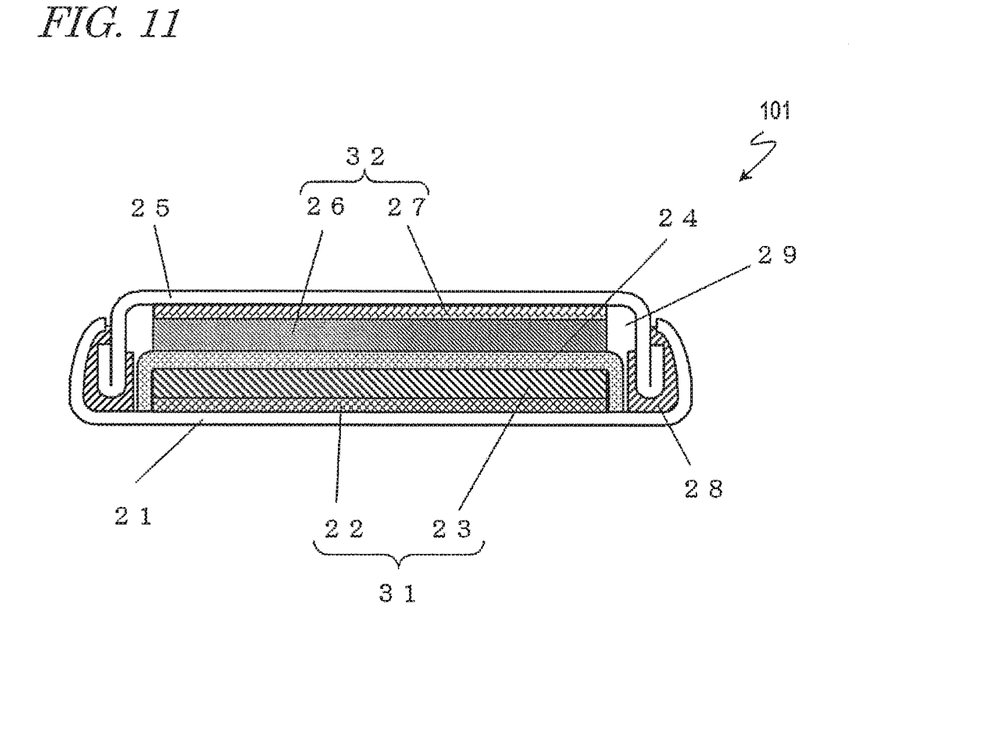
FIG. 11 is a cross-sectional view showing an embodiment of a coin-shaped rechargeable battery.

In an example described herein, the electrochemical device a rechargeable battery. FIG. 11 is a cross-sectional view showing an example of a coin-shaped rechargeable battery 101 that is one of the electrochemical devices. The coin-shaped rechargeable battery 101 shown in FIG. 11 includes a positive electrode 31, an negative electrode 32, and a separator 24. The positive electrode 31 includes a cathodic mixture layer 23 and a positive electrode collector 22 which is in contact with the cathodic mixture layer 23. The negative electrode 32 includes an anodic mixture layer 26 and an negative electrode collector 27 which is in contact with the anodic mixture layer 26. When an activated carbon electrode is used as the negative electrode, the negative electrode 32 is formed only by an activated carbon electrode instead of the combination of the anodic mixture layer 26 and the negative electrode collector 27.

The positive electrode 31 and the negative electrode 32 constitute an electrode group in which the cathodic mixture layer 23 and the anodic mixture layer 26 oppose each other via the separator 24 so as to be in contact with the separator 24.

The electrode group is housed in a space inside a case 21. The space inside the case 21 is filled with the above-described electrolytic solution 29. The positive electrode 31, the negative electrode 32, and the separator 24 are impregnated with the electrolytic solution 29. The separator 24 has minute spaces for retaining the electrolytic solution 29. Therefore, the electrolytic solution 29 is retained in the minute spaces, so that the electrolytic solution 29 is present between the positive electrode 31 and the negative electrode 32. The opening of the case 21 is closed by a closure plate 25 using a gasket 28.

Figure 10:
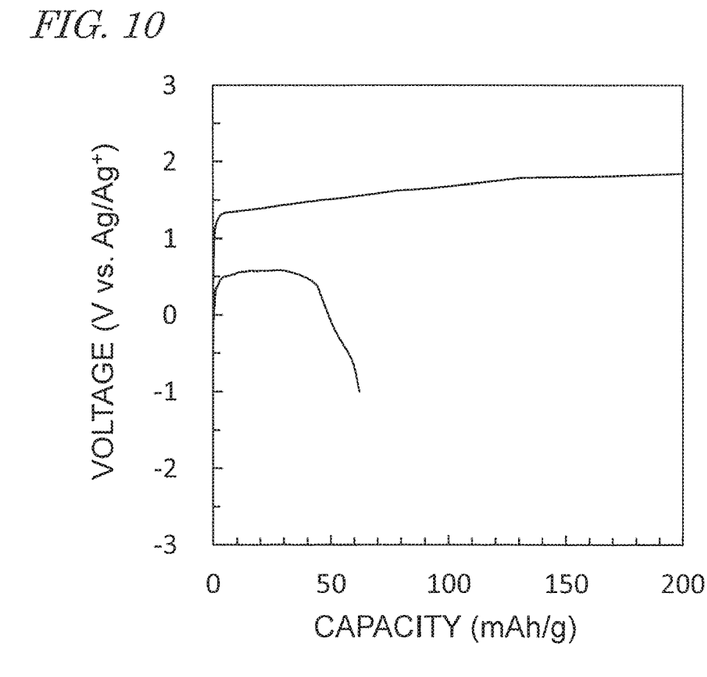
FIG. 10 shows the charge and discharge curves of Comparative Example.

Although an embodiment of the coin-shaped rechargeable battery is shown in FIG. 10, the electrochemical device of the present embodiment may have any other shape For example, the electrochemical device may have a cylindrical or polygonal shape. Alternatively, electrochemical device may have a large size for use in electric cars or the like.

2. Electrode Reaction in Electrochemical Device

Next, charging and discharging reactions in the electrochemical device of the present embodiment are described.

(1) When the negative electrode is an activated carbon electrode:

When the negative electrode is an activated carbon electrode, the electrochemical device operates as a hybrid capacitor in which only the positive electrode undergoes a faradaic reaction. Specifically, in the process of charging, carbon of the graphite is oxidized at the positive electrode. Accordingly, the hydrogen bond of the bifluoride anion that is an anion in the electrolytic solution is broken, so that a hydrogen fluoride molecule is eliminated, and only a fluoride ion is inserted between carbon layers of the graphite.

At the negative electrode, the cation that is the counterpart of the bifluoride anion is physically adsorbed to the negative electrode. Accordingly, the negative charge is accumulated in the negative electrode.

In the process of discharging, carbon is reduced, and simultaneously, the fluoride ion inserted in the positive electrode is deinserted to go into the electrolytic solution. In this process, the fluoride ion bonds to a hydrogen fluoride contained in the electrolytic solution by means of hydrogen bonding, thereby forming a complex ion. That is, the fluoride ion is deinserted as the bifluoride anion to go into the electrolytic solution. At the negative electrode, according to decrease of the negative charge accumulated in the negative electrode, the physically-adsorbed cation is eliminated from the negative electrode and deinserted to go into the electrolytic solution.

(2) when the negative electrode contains a metal fluoride:

When the negative electrode is a metal fluoride, the electrochemical device operates as a rechargeable battery.

Specifically, in the process of charging, the metal of the metal fluoride is reduced at the negative electrode according to the following formulae:

ANODIC REACTION: $MF_x + xHF + xe^- \rightarrow M + x(HF_2)^-$

CATHODIC REACTION: $C + x(HF_2)^- \rightarrow C^{x+}F^-_x + xe^+ xHF$

At the positive electrode, as described above, a fluoride ion is inserted between carbon layers of the graphite according to reduction of carbon. In this process, the hydrogen bond of the bifluoride anion is broken, so that a hydrogen fluoride molecule is eliminated, and only a fluoride ion is inserted into the graphite. The eliminated hydrogen fluoride molecule forms a hydrogen bond with a fluoride ion produced at the negative electrode and is deinserted in the form of a bifluoride anion to go into the electrolytic solution.

In the process of discharging, reactions which are opposite to the formulae shown above occur at the positive electrode and the negative electrode. When M is lead, the anodic active material is $PbF_2$, and the cell voltage is about 2.0 v.

Adding together the reactions at the positive electrode and the negative electrode cancels the bifluoride anion. That is, the concentration of the bifluoride anion in the electrolytic solution is constant irrespective of whether it is charging or discharging. Therefore, decrease of the charging/discharging reaction rate, which can be caused by variation of the ion concentration in the electrolytic solution, is suppressed.

Thus, as described above, the electrolytic solution for electrochemical devices according to the present embodiment contains the bifluoride anion as the negative charge carrier. The anion inserted between carbon layers is not a complex ion with an anion receptor but solely a fluoride ion, although the detailed mechanism is not yet elucidated. Since the inserted species is not a complex ion with an anion receptor, it is not bulky so that it can be smoothly inserted into and eliminated from the positive electrode. Thus, the electrolytic solution for electrochemical devices according to the present embodiment contains an anion which has excellent physical and chemical reactivity and can realize electrochemical devices which have large capacity and which have excellent electricity storage characteristics when applied to various electrochemical devices. According to an electrochemical device of the present embodiment, a large-capacity rechargeable battery, a large-capacity hybrid capacitor, etc., can be realized__

EXAMPLE 1

Tetrabutylammonium bifluoride and tris (hexafluoroisopropyl) borate were added to sulfolane to 0.4 mol/L and mixed. Thereafter, molecular sieve 3A was added, and dewatering was carried out by a stationary method. The supernatant was percolated, whereby electrolytic solution A was obtained. We confirmed that the moisture content in the resultant electrolytic solution, which was measured using a Karl Fischer moisture titrator, was not more than 50 ppm.

Artificial graphite powder and polyvinylidene fluoride, were weighed such that the weight ratio between artificial graphite powder and polyvinylidene fluoride was 84:16, and mixed using a planetary centrifugal mixer at 2000 rpm for 30 minutes, whereby a paste was prepared. The paste was applied over aluminum foil using a. Baker applicator and dried and cured at 10 VC for 20 minutes, whereby a graphite cathodic mixture electrode was obtained.

Figure 1:
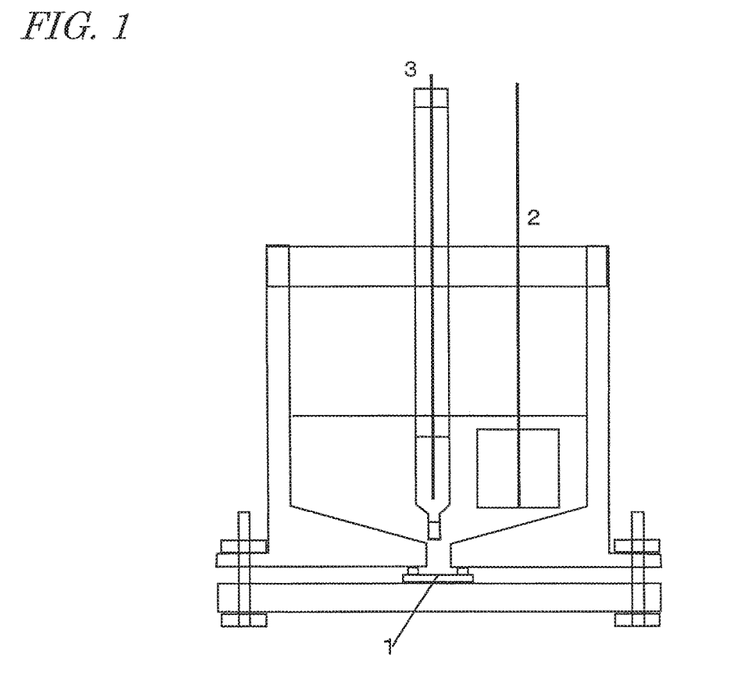
FIG. 1 is a schematic cross-sectional view showing the configuration of a three-electrode cell which was used for measurement in Examples 1 and 4 to 7 and Comparative Example.

The graphite cathodic mixture electrode was punched out into a circular shape. A solution contact surface was regulated by an O-ring, whereby the working electrode 1 was formed. An electrode connected with a platinum mesh and a platinum wire was used as the counter electrode 2. An Ag/Ag$^+$ ion electrode was used as the reference electrode 3. With these electrodes, a three-electrode cell was constructed in which the electrolytic solution was contained. A general structure of a cross section of the three-electrode cell is shown in FIG. 1.

Figure 2:
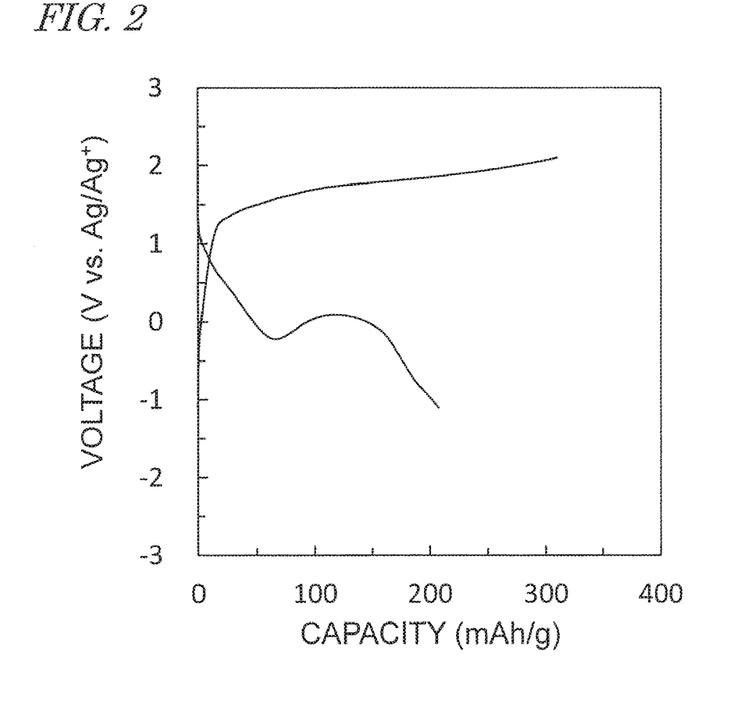
FIG. 2 shows the charge and discharge curves of Example 1.

The constructed three-electrode cell was used to cause oxidation and reduction of the working electrode with a constant current. The results of the oxidation and reduction are shown in FIG. 2. The discharge capacity of the graphite cathodic mixture electrode was 180 mAh/g.

EXAMPLE 2

Lead fluoride powder, carbon black powder, and polyvinylidene fluoride were weighed such that the weight ratio between lead fluoride, carbon black, and polyvinylidene fluoride was 8:1:1, and mixed using a planetary centrifugal mixer at 2000 rpm for 30 minutes, whereby a paste was prepared. The paste was applied over aluminum foil using a Baker applicator and dried and cured at 100° C. for 20 minutes, whereby a lead fluoride anodic mixture electrode was obtained.

Figure 3:
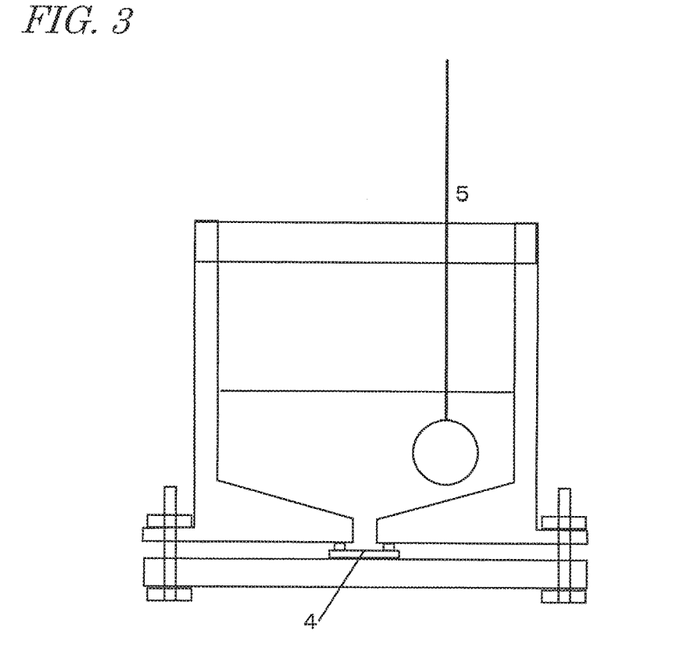
FIG. 3 is a schematic cross-sectional view showing the configuration of a two-electrode cell which was used for measurement in Examples 2 and 3.

The graphite cathodic mixture electrode was used as the positive electrode 4 as in Example 1. The lead fluoride anodic mixture electrode was punched out into a circular shape and connected with a platinum wire, whereby the negative electrode 5 was obtained. With these electrodes, a two-electrode cell was constructed in which the electrolytic solution was contained. A general structure of a cross section of the -electrode cell is shown in FIG. 3.

Figure 4:
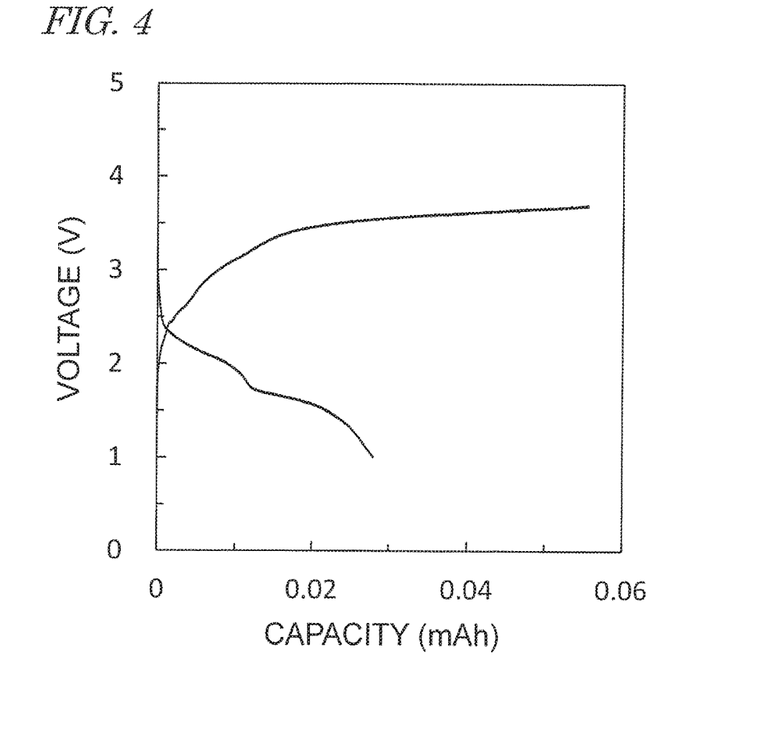
FIG. 4 shows the charge and discharge curves of Example 2.

The constructed two-electrode cell was subjected to charging and discharging with a constant current. The results of the charging and discharging are shown in FIG. 4. As a result, it was confirmed that the two-electrode cell operates as a rechargeable battery.

EXAMPLE 3

Figure 5:
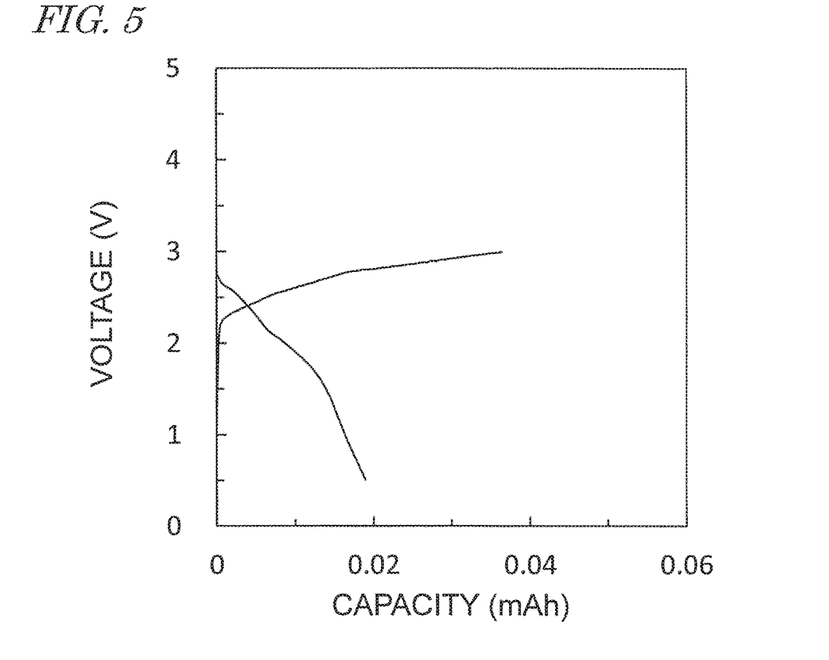
FIG. 5 shows the charge and discharge curves of Example 3.

A two-electrode cell was constructed in basically the same way as Example 2, with an activated carbon electrode used as the negative electrode 5. The two-electrode cell was subjected to charging and discharging with a constant current. The results of the charging and discharging are shown in FIG. 5. As a result, it was confirmed that the two-electrode cell operates as a hybrid capacitor.

EXAMPLE 4

Sulfolane and dimethyl carbonate were mixed such that the volume ratio was 2:8. Tetrabutylammonium bifluoride and tris(hexafluoroisopropyl) borate were added to 0.6 mol/L and mixed. Thereafter, molecular sieve 3A was added, and dewatering was carried out by a stationary method. The supernatant was percolated, whereby electrolytic solution B was obtained. We confirmed that the moisture content in the resultant electrolytic solution, which was measured using a Karl Fischer moisture titrator, was not more than 50 ppm.

Figure 6:
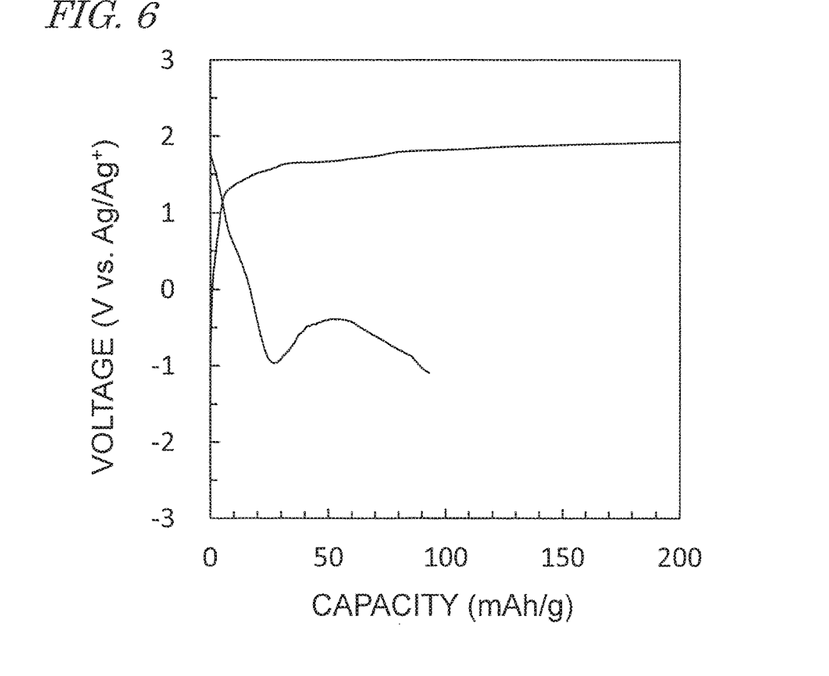
FIG. 6 shows the charge and discharge curves of Example 4.

A three-electrode cell was constructed in basically the same way as Example I except that electrolytic solution B was used. Oxidation and reduction of the working electrode was caused with a constant current. The results of the oxidation and reduction are shown in FIG. 6. The discharge capacity of the graphite cathodic mixture electrode was 93 mAh/g.

EXAMPLE 5

Potassium bifluoride and tris(hexafluoroisopropyl) borate were added to sulfolane to 0.4 mol/L and mixed. Thereafter, the supernatant was percolated, whereby electrolytic solution C was obtained. We confirmed that the moisture content in the resultant electrolytic solution, which was measured using a Karl Fischer moisture titrator, was not more than 50 ppm.

Figure 7:
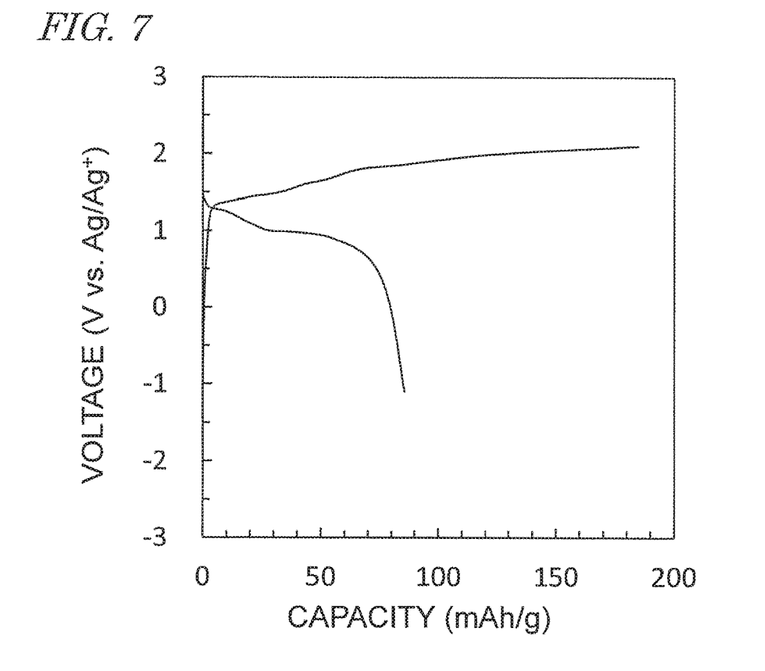
FIG. 7 shows the charge and discharge curves of Example 5.

A three-electrode cell was constructed in basically the same way as Example 1 except that electrolytic solution C was used. Oxidation and reduction of the working electrode was caused with a constant current. The results of the oxidation and reduction are shown in FIG. 7. The discharge capacity of the graphite cathodic mixture electrode was 86 mAh/g.

EXAMPLE 6

Tetrabutylammonium bifluoride and tris(2,2,3,3-tetrafluoropropyl) borate were added to sulfolane to 0.4 mol/L and mixed. Thereafter, molecular sieve 3A was added, and dewatering was carried out by a stationary method. The supernatant was percolated, whereby electrolytic solution D was obtained. We confirmed that the moisture content in the resultant electrolytic solution, which was measured using a Karl Fischer moisture titrator, was riot more than 50 ppm.

Figure 8:
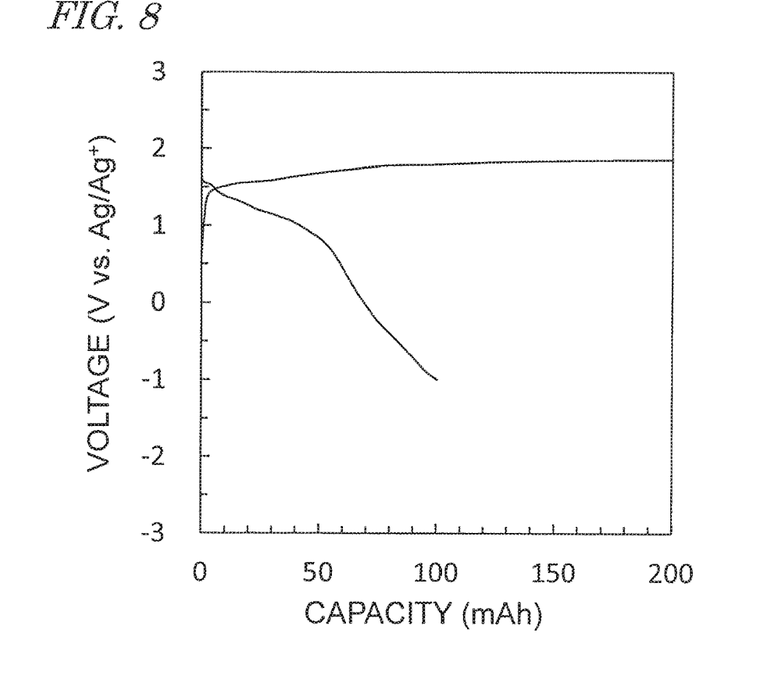
FIG. 8 shows the charge and discharge curves Example 6.

A three-electrode cell was constructed in basically the same way as Example 1 except that electrolytic solution D was used. Oxidation and reduction of the working electrode was caused with a constant current. The results of the oxidation and reduction are shown in FIG. B. The discharge capacity of the graphite cathodic mixture electrode was 100 mAh/g.

EXAMPLE 7

Tetrabutylammonium bifluoride and tris(hexafluoroisopropyl) borate were added to sulfolane to 0.4 mol/L and mixed. Thereafter, molecular sieve 3A was added, and dewatering was carried out by a stationary method. The supernatant was percolated, whereby electrolytic solution E was obtained. We confirmed that the moisture content in the resultant electrolytic solution, which was measured using a Karl Fischer moisture titrator, was not more than 1 ppm.

Figure 9:
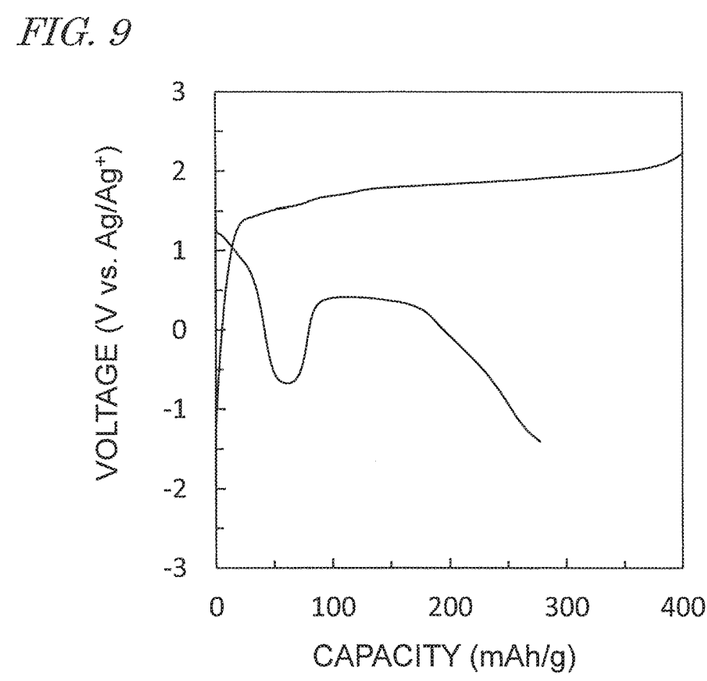
FIG. 9 shows the charge and discharge curves of Example 7.

A three-electrode cell was constructed in basically the same way as Example 1 except that electrolytic solution E was used. Oxidation and reduction of the working electrode was caused with a constant current. The results of the oxidation and reduction are shown in FIG. 9. The discharge capacity of the graphite cathodic mixture electrode was 277 mAh/g

COMPARATIVE EXAMPLE

Tris(hexafluoroisopropyl) borate was added to propylene carbonate to 0.6 mol/L. Then, lithium fluoride in the weight of 2.0 mol/L, which was an excessive amount, was added. The resultant mixture was stirred for one day. The supernatant was percolated, whereby electrolytic solution X was obtained. We confirmed that the moisture content in the resultant electrolytic solution X was not more than 50 ppm.

A three-electrode cell was constructed in basically the same way as Example 1 except that electrolytic solution X was used. Oxidation and reduction of the working electrode was caused with constant current. The results of the oxidation and reduction are shown in FIG. 10. The discharge capacity of the graphite cathodic mixture electrode was 62 mAh/g.

(Analysis of Results)

Although the electrolytic solution of Comparative Example contains a boron compound which is the same as those of Examples 1, 4, and 5, it was confirmed that decomposition of the electrolytic solution started at a low potential in the process of discharging. It is estimated that this decomposition of the electrolytic solution leads to a shallow charging depth, so that the discharge capacity is small. Meanwhile, in the cells of Examples 1, 4, and 5, the decomposition of the electrolytic solution was reduced, and larger discharge capacities were achieved than in the cell disclosed in Journal of The Electrochemical Society, 154 10 A929-A936 2007.

As can be seen from the results of Examples 1, 4, 5, and 6, it was confirmed that a high discharge capacity can obtained even when various organic solvents, various cations which can be the counterpart of the bifluoride anion, and various boron compounds are used.

Further, it was confirmed from Examples 2 and 3 that the electrochemical device can operate as a rechargeable battery or a hybrid capacitor.

Furthermore, it was confirmed from Examples 1 and 7 that the discharge capacity can be further increased by adjustment of the moisture content.

The electrolytic solution and the electrochemical device disclosed in the present application are useful as a power supply for smartphones, cell phones, portable information devices, personal computers, video cameras, handheld game consoles, etc. Also, the electrochemical energy storage device disclosed in the present application. can be used as a power supply for driving electric tools, cleaners, robots, etc. , or as a power supply for driving or supporting an electric motor of electric cars, hybrid electric cars, plug-in hybrid electric cars, fuel cell powered cars, etc.

While the present invention has been described with respect to exemplary embodiments thereof, it will be apparent to those skilled in the art that the disclosed invention may be modified in numerous ways and may assume many embodiments other than those specifically described above. Accordingly, is intended by the appended claims to cover all modifications of the invention that fall within the true spirit and scope of the invention.

This application is based on Japanese Patent Applications No. 20015-201912 filed on October 13, the entire contents of which are hereby incorporated by reference.

What is claimed is:

1. An electrolytic solution for a fluoride ion secondary battery, comprising:
   a salt consisting of a bifluoride anion and a cation;
   a compound containing boron; and
   an organic solvent.

2. The electrolytic solution of claim 1, wherein the organic solvent contains sulfolane.

3. The electrolytic solution of claim 2, wherein the salt consisting of a bifluoride anion and a cation is tetrabutylammonium bifluoride.

4. The electrolytic solution of claim 3, wherein the compound containing boron is tris(hexafluoroisopropyl) borate.

5. The electrolytic solution of claim 3, wherein the compound containing boron is tris(2,2,3,3-tetrafluoropropyl) borate.

6. The electrolytic solution of claim 2, wherein
   the salt consisting of a bifluoride anion and a cation is potassium bifluoride, and
   the compound containing boron is tris(hexafluoroisopropyl) borate.

7. A fluoride ion secondary battery, comprising:
   the electrolytic solution as set forth in claim 1; and
   a positive electrode which contains graphite.

8. The electrochemical device of claim 7, further comprising an negative electrode which contains activated carbon or a metal fluoride.

* * * * *